Oct. 23, 1928.

E. A. SPERRY 1,688,559

GYROSCOPIC LINE OF SIGHT STABILIZER

Filed July 21, 1921 2 Sheets-Sheet 1

Inventor
ELMER A. SPERRY.
By his Attorney
Herbert H. Thompson

Oct. 23, 1928. 1,688,559
E. A. SPERRY
GYROSCOPIC LINE OF SIGHT STABILIZER
Filed July 21, 1921 2 Sheets-Sheet 2
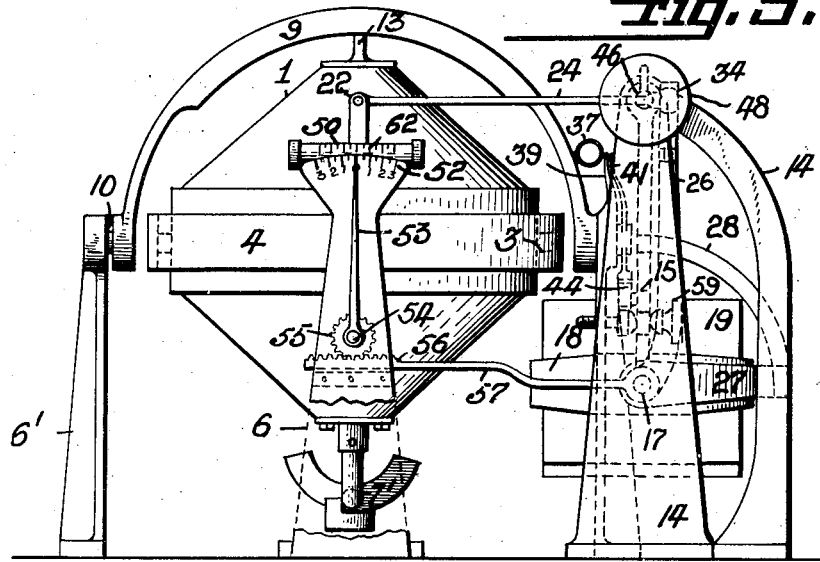

Patented Oct. 23, 1928.

1,688,559

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

GYROSCOPIC LINE OF SIGHT STABILIZER.

Application filed July 21, 1921. Serial No. 486,526.

This invention relates to airplane photography and has to do with the maintenance of a vertical line of sight between the camera and the earth. In other words, the invention relates to the stabilization of a vertical line of sight so that a camera carried on an airplane and adjusted to photograph the ground directly below the airplane will at all times maintain the proper line of sight irrespective of the varying inclinations of the airplane.

The object of the present invention is to devise a small, compact, light and reliable apparatus for complete stabilization of such a line of sight between an airplane and the earth.

Heretofore, attempts have been made to obtain such results by stabilizing the whole camera. This method would require a comparatively large gyroscope for effecting the stabilization, and would render the handling of the camera a difficult matter, as the slightest pressure applied to the stabilized camera will disturb the functioning of the delicate stabilizing apparatus.

According to the present invention the camera may be secured upon the aeroplane so as to partake of all of the movements or varying inclinations of the plane. Before the lenses of the camera is placed a small mirror inclined normally at an angle 45° to the camera if the latter is horizontal so as to reflect into the camera lenses a view of the ground below the aircraft. The mirror is mounted for universal movement about its center, and its movements about this point controlled by a gyroscopic pendulum, so that as the airplane turns about its longitudinal or transverse axes and turns the camera accordingly, the mirror will be turned in the same direction as the apparent movement of the gyro-pendulum but through one half the angle thereof. In this way the mirror will always present to the camera the proper angle to reflect thereinto a view of the ground directly beneath.

Referring to the drawings wherein I have shown what I now consider to be the preferred form of my invention:

Fig. 3 is a rear elevation looking from left to right in Fig. 1.

Fig. 4 is a detail of the gyro centralizing means shown in Fig. 1.

Fig. 5 is a detail on a larger scale of a part of the mechanism shown in Fig. 4.

Figure 1:
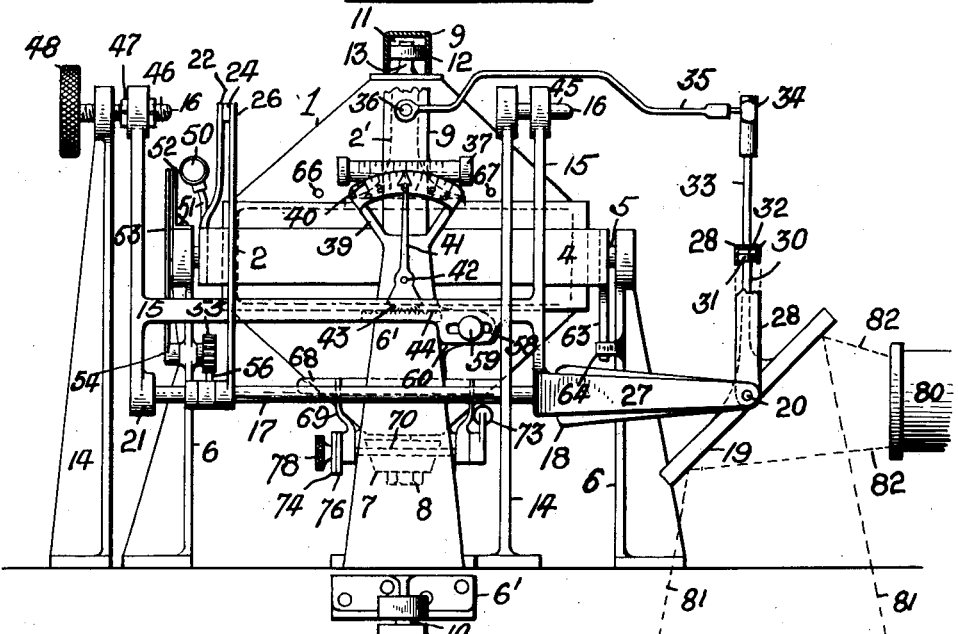
Fig. 1 is a side elevation of a gyroscope and a mirror controlled thereby.
Figure 2:
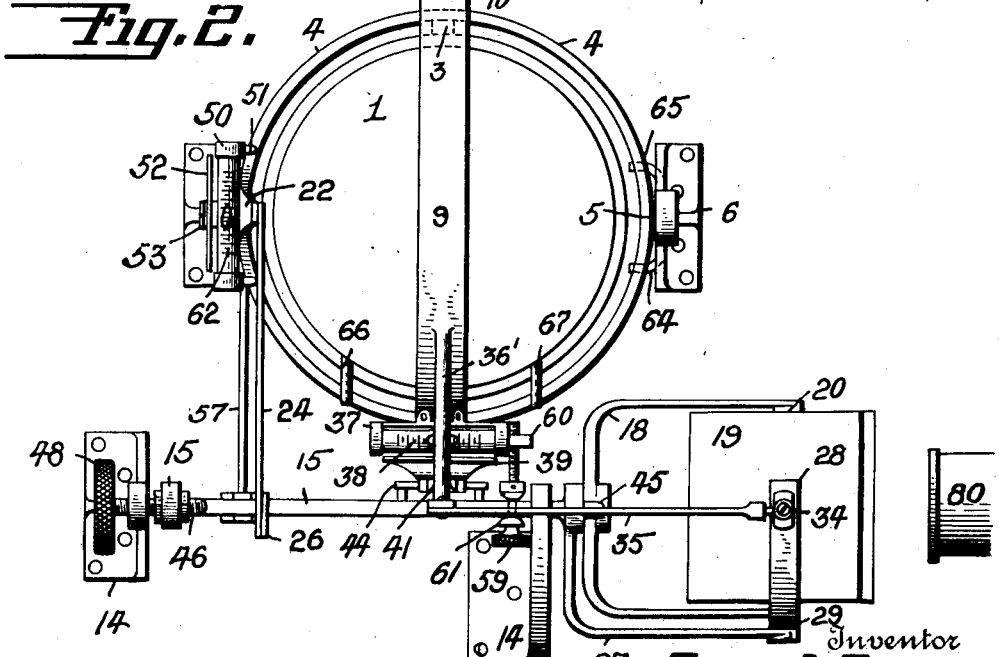
Fig. 2 is a plan view thereof.

Figs. 6 to 9, inclusive, represent diagrammatically the movements of the mirror with respect to the movements of the camera in maintaining the vertical line of sight.

In the drawings 1 represents the gyro casing within which the rotor 2 is mounted with its shaft 2' in a vertical position. The casing 1 is mounted for oscillation about a horizontal axis 3 in a gimbal ring 4 which ring is, in turn, mounted for oscillation about a horizontal axis 5 at right angles to the aforesaid axis 3, in supporting standards 6. The gyro is thus mounted with three degrees of freedom, and may be provided with a weight 7 secured to its lower end by means of a screw 8 whereby the weight may be adjusted toward or away from the gyro casing to vary the pendulous factor of the gyro.

It will, of course, be understood that the gyro may be provided with any suitable automatic damping means such as indicated at 7' in Fig. 3, and more fully disclosed in U. S. Letters Patent to Titterington, No. 1,324,482 for "self damping gyro pendulum".

Also carried by supporting standard 6' is a bail 9, pivotally attached to the standard for oscillation about a horizontal axis 10. Said bail may be provided with a channel 11 within which is a roller 12 carried on a spindle 13 on the top of the gyro casing. Thus, movement of the gyro about its axis 3 will cause a similar movement of the bail about its axis 10, while movement of the gyro about axis 5 will not affect the bail.

Carried by standards 14 is a bracket 15 adapted to turn with respect to the standards about an axis 16—16. Rotatably carried in bearings 21 of said bracket 15 is a spindle 17 carrying integral therewith a forked member or yoke 18 which supports a mirror or line of sight member 19 adapted to turn with respect to the yoke about axis 20. Thus, the mirror may be rotated about one axis by rotation of shaft 17 and also about axis 20 at right angles thereto; these axes intersecting in the plane and substantially at the center of the mirror.

Reaching upwardly from ring 4 is an arm 22 to which is pivotally connected a laterally extending link 24. Said link is in turn pivotally connected to a downwardly extending lever 26 fixedly secured to shaft 17. Thus, the apparent turning of gimbal ring 4 about axis 5 will cause rotation of shaft 17 about its longitudinal axis; the connecting linkage being so proportioned that the rotation of the shaft 17 will be equal to half the rotation of ring 4 and in the same direction.

Integral with bracket 15 is an arm 27 reaching around yoke 18. An arched member 28 somewhat similar to bail 9 is pivotally attached to arm 27 at a point 29 in alignment with the axis 20 of the mirror when the latter is in its normal position. An arm 30 fixed to the back of mirror 19 carries a roller 31 engaging within the groove 32 of bail 28. An arm 33 may be fixed to the top of bail 28 and may be connected by a ball and socket joint 34 to a link 35 in turn pivotally attached at 36 to an arm 36' fixed on the bail 9. Movement of the gyro about its axis 3, turning bail 9 about axis 10 will thus turn bail 28 about its axis 29, and this will cause the mirror 19 to turn about its axis 20. As in the case of arms 22, 26, the distance between pivot 36 and the axis 10 of the bail 9 is half the distance between pivot 34 and the axis 20 of the mirror, so that the movement of mirror 19 about axis 20 will be half that of the gyro about its axis 3.

The movement of roller 31 in bail 28 will obviously permit the mirror to turn with spindle 17 as its axis. Thus it will be seen that any movement of the gyro about either or both of its horizontal axes will be transmitted to the extent of half its value to the mirror about its corresponding axis or axes.

In the event that there should be a slight error in the gyroscope with respect to a true horizontal position it will be understood that a corresponding error of half the magnitude will be transmitted to the mirror. Obviously this error may be corrected by correcting the position of the gyro itself or by introducing a correction to the mirror independently of the gyro. I have shown the latter method, as preferred.

In order to ascertain the extent of the error in the gyro, a level 37 is fixed on the bail 9 and is provided with graduation marks 38 for reading in connection with the bubble in the level. The liquid in the level should preferably be thick enough to prevent too rapid or erratic shifting of the bubble without being too sluggish. Near the level I have shown a bracket 39 rigidly mounted, as for instance on one of standards 6', and provided with scale graduations 40. Cooperating with said scale is shown an index 41 which is pivoted at 42 to the said standard 6' and is provided with a segmental gear 43, meshing with a rack 44 integral with swinging bracket 15. This bracket 15 as we have seen is mounted to swing on axis 16—16. It is also adapted to slide along its forward supporting trunnion 45, while it is prevented from so moving on its rear trunnion 46 by collars 47 fixed on the trunnion. The trunnion, however, is threaded into standard 14 and is provided with a knob 48. Rotation of this knob will thus move the bracket 15 forward or backward. This movement, it will be observed, will move the mirror 19 and bail 28 forward or backward as the case may be, and since the mirror and bail are connected to link 35 which does not participate in this adjusting movement, the mirror will turn about its axis 20. The gearing connection between bracket 15 and index 41 will at the same time cause the index to move along scale 40. The connections are such that if the level shows the gyro to be tilted in one direction and the knob 48 is actuated to cause index 41 to effect the same reading with scale 40 that the bubble in level 37 does with scale 38, the mirror will have been turned in the proper direction and to the proper extent to compensate for the error of the gyro. In other words, if the gyro were tilted in error clockwise about its axis 3, such movement would be transmitted to the mirror and the error indicated by level 37. To correct this error, the mirror would have to be turned counterclockwise about its axis 20 through half the angle through which the gyroscope has tilted. Turning of knob 48 to the right will move bracket 15 forward and thus effect such counterclockwise movement of the mirror, while the index 41 will be turned to the left over scale 40. The bubble in level 37 will, of course, have moved to the left, and assuming the error indicated thereby to be three of the graduation marks 38, the knob 48 will be turned to place index 41 on the third graduation mark on scale 40.

The scale 40 is so graduated and the above described parts of the means for adjusting the mirror so designed that movement of pointer 41 to a graduation on scale 40, corresponding to the position of the bubble in level 37, causes turning of the mirror through one half the angle of tilt of the gyroscope and in a direction opposite thereto. In other words, the pointer 41 is kept pointed directly at the bubble.

In order to ascertain the error of the gyro about its axis 5 and to correct the position of the mirror, about its corresponding axis, a level 50 may be carried on an arm 51 fixed to gimbal ring 4. The level may be graduated as in the case of level 37. A scale 52 similar to scale 40 may be carried by one of standards 6. An index 53 pivoted at 54 to said standard 6 cooperates with this scale. A gear 55 is fixed to the index and meshes with a rack 56 connected through an arm 57 to spindle 17. Bracket 15 may be provided with a slotted portion 58 through which projects a screw 59 having threaded engagement with a projection 60 on standard 6'. Collars 61 may be provided on the screw 59 so that turning of the screw will cause bracket 15 to turn about its axis 16—16. This swinging movement of bracket 15 with spindle 17 which is connected by level 26 and link 24 to arm 22 which does not participate in the correction adjustment will cause spindle 17 to rotate with mirror 19 to correct the error introduced by the gyro. The swinging of spindle 17 will also move rack 56 and turn index 53 through gear 55. Here also, the parts are preferably so arranged and proportioned that when the reading of index 53 on scale 52 corresponds with the reading of the bubble in level 50 with the graduations 62 thereon, the mirror will be in correct position having been turned through half the angle of tilt of the gyroscope and in a direction opposite thereto.

It will be seen that the cooperation between the levels 37 and 50 with the respective scales permits the obtaining of the true vertical and the starting of photography without the necessity of waiting for the gyroscope to finally settle on the horizontal. If desired, an additional level of different damping characteristics from level 37 may be positioned on bail 9 adjacent said level, whereby the inclination of the gyroscope about the axis 3—3 may be determined with a high degree of accuracy. Similarly a level of different sensitiveness from level 50 may be mounted on arm 51 adjacent said level 50.

It will be understood that airplanes frequently turn about their longitudinal or transverse axes through excessive angles, as for instance, when banking or looping. Means may be provided for preventing excessive precessional movements of the gyro at such times. To this end I may provide an arm 63 integral with gimbal ring 4 extending downwardly between brackets 64, 65. Also, pins 66, 67 may project from the gyro casing 1 to engage the ring 4 upon predetermined rotation of the casing about axis 3. Thus, the projection 63 acting between brackets 64, 65 and the pins 66, 67 acting in conjunction with ring 4 will serve to prevent excessive precession of the gyro about axes 5 and 3 respectively.

The spinning of the gyro rotor may be accomplished by any of the well known methods and need not, therefore, be shown here.

When the apparatus is not in operation it should preferably be locked against oscillation about axes 3 and 5; also from time to time and especially when starting up the gyro, or after its precession has been checked by stops 64, 65, 66, 67 it is desirable to centralize the gyro in a substantially level position. For this purpose I may provide a ring 68 adapted to fit around the lower portion of casing 1 as shown in Fig. 1 with means for moving the ring to operative or inoperative positions (see also Figs. 4 and 5). The ring may be pivotally carried by levers 69 which are in turn supported by pins 70 reaching through slotted members 71 fixed to standard 6'. Each of said pins 70 may be provided with a crank 72 interconnected by a tension spring 73. On the opposite end of each of pins 70 I have shown another crank 74. These cranks may be interconnected by links 75, 76. By having the pin 77 which connects the link 76 to crank 74 non-rotatably fixed in link 76, but rotatable in crank 74, and providing said pin with a knob 78 fixed thereon, I may, by rotating said knob cause links 75, 76 to assume the extended position with respect to each other shown in Fig. 4, or the folded position shown in Fig. 5.

Assuming the parts to be in the positions shown in solid lines in Fig. 4, the centralizing ring 68 being in inoperative position; rotation of knob 78 counterclockwise will cause link 76 to turn about axis 77 toward the folded position with respect to link 75 shown in Fig. 5. This will begin to draw the ends of crank 74 toward each other causing pins 70 to rotate with arms 69, raising ring 68. Obviously, the raising of this ring will force a spreading of pins 70 which may take place in slots 79. The rotation of pins 70 will also cause cranks 72 to turn outwardly and downwardly with spring 73. As soon as the spring passes below the axis of pins 70 it will, by reason of its tendency to draw the ends of cranks 72 together, tend to throw the arms 69 upwardly with ring 68 into the dotted line position shown in Fig. 4 or the full line position shown in Fig. 5. The parts will then occupy the positions indicated in Fig. 5; the spring 73 holding the ring 68 against the rotor casing 1 and centralizing the same. Clockwise rotation of knob 78 will return the parts to their original position once more setting the gyro free. The gyro should be substantially level when set free.

The apparatus is, of course, secured to the airplane in a position where the image of the ground below may reach the mirror 19. The camera 80 which may be secured to the airplane, now shown, in any suitable manner, is shown as being so positioned with respect to the mirror 19 that light rays 81 reaching the mirror 19 from the ground directly below the airplane will be reflected as at 82 into the camera.

The operation of the apparatus is as follows:

Assuming the gyro to be mounted upon an airplane, with the camera 80 also secured to the airplane in the position shown, the camera and the supporting standards 6, 6' of the gyro will obviously partake of all of the rolling and tilting movements of the airplane, while the gyro rotor will, of course, hold its plane of rotation, causing relative movement between the gyro and its frame so that the mirror 19 will be turned about its axis 17 or 20 through half the angle with respect to space that the airplane turns in the same direction. With respect to the airplane itself the mirror turns in the opposite direction to that in which the airplane turns, and to half the extent.

When the levels 37, 50 show that the gyro is not level, actuation of knobs 48, 59 will correct the position of the mirror without affecting the position of the gyro.

The relative positions of the camera and mirror about a given axis are diagrammatically shown in Figs. 6 to 9. In Fig. 6 the arrow represents the vertical line of sight which is to be maintained, while the lines I, II and III indicate the angle at which the vertical light rays must be reflected by the mirror to reach the camera lenses 83 in the various positions of the latter. Fig. 7 shows the mirror in the normal position, or, in other words, inclined at an angle of 45° to the ground and to the camera. Fig. 8 represents the camera in a depressed position, having tilted with the airplane through the angle $\theta$ and the mirror 19 having been tilted about its center (with respect to space) in the same direction through the angle $\frac{\theta}{2}$. Fig. 9 shows the camera as having tilted upwardly through the angle X, and the mirror as having been turned in the same direction through the angle $\frac{X}{2}$. In each instance it will be seen that the mirror presents the proper angle to the vertical light beam to reflect it into the camera.

The mirror 19 is surface silvered and ground with a high degree of planar accuracy and within one to three wave lengths of light. Such mirrors are necessarily more or less expensive, the expense increasing rapidly with the size. This is kept to the absolute minimum by positioning the mirror's own Cardan center very near the surface and not far from the optical axis.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination, a support, a gyroscope and a reflector mounted thereon, the gyroscope being connected to the reflector to control the position thereof, means for indicating the position of the gyroscope with respect to the earth, and means for adjusting said reflector with respect to the earth without disturbing the gyroscope.

2. In combination, a gyroscope, a reflector connected to said gyroscope and adapted to be positioned thereby about a plurality of axes and means for adjusting said reflector about a plurality of axes independently of said gyroscope without disturbing the latter.

3. In combination, a gyroscope, a reflector connected to said gyroscope and adapted to be positioned thereby, means for locking said gyroscope and means for adjusting said reflector independently of said gyroscope.

4. In combination, a support, a gyroscope and a reflector carried thereby, said gyroscope being connected to said reflector and adapted to control the position thereof, means for centralizing said gyroscope with respect to said support, and means for adjusting said reflector independently of the gyroscope.

5. In combination with a support adapted to carry a camera in fixed relation thereto, a reflector universally mounted on said support and positioned to reflect the image of objects below the support into the camera, stabilizing means for adjusting the position of the reflector in response to predetermined movements of said support, means for indicating error in the position of the reflector, and means for correcting such error.

6. In combination, a gyroscope, a gimbal ring supporting said gyroscope, a bail adapted to be actuated by said gyroscope, a reflector mounted for turning about a plurality of axes, means connecting said ring and reflector for controlling the movements of the latter about one of its axes and means connecting said bail and reflector for controlling movements of the latter about another of its axes.

7. In combination, a support, a stabilizing element and a reflecting element mounted thereon, the stabilizing element being connected to the reflecting element to control the position thereof, means for indicating the true position of one of said elements and means for adjusting one of said elements.

8. In combination, a support, a stabilizing element and a reflecting element mounted thereon, the stabilizing element being connected to the reflecting element to control the position thereof, means for indicating an error in the stabilizing element and means for correcting the resultant error in the reflecting element.

9. In combination, a support, a gyroscopic pendulum and a reflector mounted thereon, said pendulum being connected to the reflector to control the position thereof, means for indicating an error in the position of the pendulum, means for adjusting the reflector independently of the pendulum and means for indicating the position of the reflector with respect to the pendulum.

10. In combination, a support, a gyroscopic pendulum and a reflector mounted thereon, said pendulum being connected to the reflector to control the position thereof, means for indicating an error in the position of the pendulum, means for adjusting the reflector independently of the pendulum, means for indicating the position of the reflector with respect to the pendulum and means for automatically damping oscillations of the pendulum.

11. In combination, a gyroscope, a level stabilized thereby, and provided with graduations, an independently adjustable line of sight member, a scale adjacent said level, and a coordinating device cooperating with said scale and connected with said member for positioning said member in a given relation with respect to the position indicated by the level.

12. In combination with the elements specified in claim 11, a second level stabilized by said gyroscope and at an angle to the first mentioned level, and means including a scale adjacent said second mentioned level for causing movement of said member in coordination with said second level.

13. In combination, a gyroscope, a level connected thereto, a line of sight member adjustable independently thereof, a scale cooperating with said level, means cooperating with said scale and connected with said member for positioning the latter in a definite relation with respect to the position indicated by the level, and means connecting said gyroscope and said member for altering the position of the latter in response to the apparent movements of the gyroscope.

14. In combination, a gyroscope, a level connected thereto and provided with graduations, a line of sight member adjustable independently of the gyroscope, a scale adjacent said level, a second level at an angle to the first mentioned level and connected to said gyroscope, a scale adjacent said second level, means cooperating with the first mentioned scale for positioning said member in accordance with the position indicated by the first mentioned level, means cooperating with the second mentioned scale for positioning said member in accordance with the position indicated by the second mentioned level and means connecting said gyroscope and said member for altering the position of the latter in response to the apparent motions of said gyroscope in a plurality of planes.

15. In combination, a gyroscope, a level mounted for movement therewith about an axis, said level being provided with graduations for indicating the angle of tilt of said gyroscope about said axis, a line of sight member adjustable with respect to the gyroscope, and means including a scale adjacent said level for adjusting said member in accordance with the readings of said level.

16. In combination, a gyroscope, a level mounted for movement therewith about an axis, said level being provided with graduations for indicating the angle of tilt of said gyroscope about said axis, a line of sight member adjustable with respect to the gyroscope, and means cooperating with said graduations for turning said member with respect to the gyroscope through a fraction of the angle indicated by said level.

17. In combination, a gyroscope, a level mounted for movement therewith about an axis, said level being provided with graduations, a scale adjacent said level and having graduations corresponding to those of said level, a line of sight member adjustable with respect to the gyroscope, a reference member cooperating with said scale, and means cooperating with said reference member and said scale for adjusting said first named member through one half the angle of tilt of said gyroscope.

18. The combination with a gyroscope, an independently mounted optical element, means connecting said gyroscope and element for stabilizing the latter by the former, means for adjusting the element with respect to the gyroscope, a level on the gyroscope having a movable indicator, and a cooperating index connected with said element, whereby said element may be maintained in the desired position by maintaining the index in a predetermined relation to said level indicator.

In testimony whereof I have affixed my signature.

ELMER A. SPERRY.